(12) United States Patent
Ha

(10) Patent No.: US 11,584,322 B2
(45) Date of Patent: Feb. 21, 2023

(54) AIRBAG DEPLOYMENT CONTROL APPARATUS AND METHOD FOR VEHICLE

(71) Applicant: HYUNDAI MOBIS CO., LTD., Seoul (KR)

(72) Inventor: Min Kyu Ha, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 42 days.

(21) Appl. No.: 17/487,005

(22) Filed: Sep. 28, 2021

(65) Prior Publication Data

US 2022/0379830 A1 Dec. 1, 2022

(30) Foreign Application Priority Data

Jun. 1, 2021 (KR) .......................... 10-2021-0070946

(51) Int. Cl.
| | | |
|---|---|---|
| *B60R 21/0132* | (2006.01) | |
| *B60R 21/0136* | (2006.01) | |
| *B60R 21/015* | (2006.01) | |
| *B60R 21/01* | (2006.01) | |

(52) U.S. Cl.
CPC ...... *B60R 21/0136* (2013.01); *B60R 21/0132* (2013.01); *B60R 21/01544* (2014.10); *B60R 21/01552* (2014.10); *B60R 2021/01211* (2013.01)

(58) Field of Classification Search
CPC .......... B60R 21/0136; B60R 21/01544; B60R 21/01552; B60R 21/0132; B60R 2021/01211
See application file for complete search history.

(56) References Cited

FOREIGN PATENT DOCUMENTS

| DE | 19811865 A1 | 9/1999 |
|---|---|---|
| DE | 10005010 A1 | 8/2001 |
| DE | 102007015768 A1 | 10/2007 |
| DE | 102011087698 A1 | 6/2013 |
| DE | 102018220043 A1 | 11/2019 |

OTHER PUBLICATIONS

Office Action dated Jan. 6, 2022 in the corresponding German Patent Application No. 102021122118.8.

*Primary Examiner* — Mathew Franklin Gordon
(74) *Attorney, Agent, or Firm* — NovoTechIP International PLLC

(57) ABSTRACT

An airbag deployment control apparatus for a vehicle, comprising: a first sensing unit configured to sense yaw rate information including yaw rate and acceleration values of a vehicle; a second sensing unit configured to sense whether a passenger in the vehicle wears a seat belt; a collision sensing unit configured to sense whether the vehicle collides; a communication unit configured to receive seat position information and ADAS operation information of the vehicle; and a control unit configured to calculate dynamic behavior information of the passenger and decide an airbag deployment point based on the dynamic behavior information of the passenger and the collision sensing result of the collision sensing unit.

16 Claims, 5 Drawing Sheets

<Double Mass Spring Damper Model> m [kg] – mass
k [N/m] – spring constant (stiffness)
d [N-s/m] – damping coefficient
F [N] – external force acting on the body
x [m] – displacement of the body

AIRBAG DEPLOYMENT CONTROL APPARATUS AND METHOD FOR VEHICLE

CROSS-REFERENCE TO RELATED APPLICATIONS

This application claims priority from and the benefit of Korean Patent Application No. 10-2021-0070946, filed on Jun. 1, 2021, which is hereby incorporated by reference for all purposes as if set forth herein.

BACKGROUND OF THE INVENTION

1. Field of the Invention

Exemplary embodiments of the present disclosure relate to an airbag deployment control apparatus and method for a vehicle, and more particularly, to an airbag deployment control apparatus and method for a vehicle, which can control an airbag deployment point based on behavior estimation of a passenger on board the vehicle.

2. Discussion of Related Art

When a vehicle collides, the bodies of a driver and passenger are rapidly bent forward according to the law of inertia. Depending on how hard the vehicle collides, the upper body of the driver may crash into a steering device of the vehicle. In this case, the driver may be severely injured. In order to prevent such an injury, an airbag is installed in the vehicle. In case of a vehicle collision, the airbag is deployed to protect the driver and passenger. However, when the driver does not wear a seat belt, the driver's head may hit the steering device before the airbag is completely deployed, which causes a severe injury to the driver's head. That is, a backslap occurs, while the driver's head hits the airbag.

Such a conventional airbag deployment algorithm is based on a passive reflective algorithm which relies on a sensing value that is generated after a vehicle collision. Recently, it may be predicted that a driver's head and chest will be quickly moved forward and crash into the steering device before the airbag is completely deployed, when emergency braking is performed by the DAS (Driving Assistance System), unlike in a regulation/merchantability test. Therefore, there is a need for an airbag deployment control method into which an actively connected DAS is reflected.

The related art is technical information which the present inventor has retained to derive the present disclosure or has acquired during the process of deriving the present disclosure. The related art is not necessarily a publicly known technique which is published to the public before the application of the present disclosure.

BRIEF SUMMARY OF THE INVENTION

Various embodiments are directed to an airbag deployment control apparatus and method for a vehicle, which can determine an airbag deployment point based on behavior estimation of a passenger and operate an airbag, in case of a vehicle collision or emergency braking.

The problems to be solved by the present disclosure are not limited to the above-mentioned problems, and the other unmentioned problems will be clearly understood from the following description by those skilled in the art.

In an embodiment, an airbag deployment control apparatus for a vehicle may include: a first sensing unit configured to sense yaw rate information including yaw rate and acceleration values of a vehicle; a second sensing unit configured to sense whether a passenger in the vehicle wears a seat belt; a collision sensing unit configured to sense whether the vehicle collides; a communication unit configured to receive seat position information and Advanced Driver Assistance Systems (ADAS) operation information of the vehicle; and a control unit configured to calculate dynamic behavior information of the passenger by inputting the yaw rate information from the first sensing unit, the belt wearing information from the second sensing unit and the ADAS operation information from the communication unit to a passenger behavior estimation algorithm, and determine an airbag deployment point based on the dynamic behavior information of the passenger and the collision sensing result of the collision sensing unit.

The passenger behavior estimation algorithm may be a second ordinary differential equation based on a Damper-Mass-Spring (DMS) model.

The control unit may determine a locking weight factor based on the yaw rate value and the ADAS operation information, determine a weight factor or saturation based on the belt wearing information, and calculates the dynamic behavior information by applying one or more of the acceleration, the locking weight factor, the saturation and the weight factor to the second ordinary differential equation, the dynamic behavior information including one or more of displacements, speeds and accelerations of the passenger's head and chest.

The control unit may determine a locking weight factor based on keeping lane, when the yaw rate value is equal to or greater than a preset threshold and the ADAS operation information contains data indicating that an Lane Keeping Assist System (LKAS) is operating, and determine a locking weight factor based on turn around, when the yaw rate value is equal to or greater than the threshold and the ADAS operation information contains data indicating that the LKAS is not operating.

The control unit may determine a belt wearing weight factor or belt wearing saturation over time, when the passenger wears a seat belt, and determine a belt non-wearing weight factor or belt non-wearing saturation over time, when the passenger does not wear the seat belt.

The control unit may calculate an actual position of the passenger by adding the seat position information and the displacements of the passenger's head and chest.

When head and chest displacements corresponding to the actual position of the passenger are equal to or greater than preset head and chest displacement thresholds, respectively, the control unit may determine that the airbag deployment point has reached.

The control unit may receive a collision sensing value from the collision sensing unit, calculate a change in the collision sensing value, calculate the moving average and speed of the collision sensing value when the change in the collision sensing value is equal to or greater than a threshold change, and determines that the airbag deployment point has reached, when the moving average of the collision sensing value is equal to or greater than a threshold moving average and the speed of the collision sensing value is equal to or greater than a threshold speed.

In an embodiment, an airbag deployment control method for a vehicle may include: receiving, by a control unit, one or more pieces of yaw rate information, belt wearing information, ADAS operation information and seat position information, the yaw rate information including acceleration and yaw rate values of a vehicle; calculating, by the control unit, dynamic behavior information of a passenger by inputting the yaw rate information, the belt wearing information and the ADAS operation information to a passenger behavior estimation algorithm; and determining, by the control unit, an airbag deployment point based on the dynamic behavior information of the passenger and a collision sensing result of a collision sensing unit.

The passenger behavior estimation algorithm may be a second ordinary differential equation based on a DMS model.

In the calculating of the dynamic behavior information of the passenger, the control unit may determine a locking weight factor based on the yaw rate value and the ADAS operation information, determine a weight factor or saturation based on the belt wearing information, and calculate the dynamic behavior information by applying one or more pieces of the acceleration, the locking weight factor, the saturation and the weight factor to the second ordinary differential equation, the dynamic behavior information including one or more of displacements, speeds and accelerations of the passenger's head and chest.

In the calculating of the dynamic behavior information of the passenger, the control unit may determine a locking weight factor based on keeping lane, when the yaw rate value is equal to or greater than a preset threshold and the ADAS operation information contains data indicating that an LKAS is operating, and determine a locking weight factor based on turn around when the yaw rate value is equal to or greater than the threshold value and the ADAS operation information contains data indicating that the LKAS is not operating.

In the calculating of the dynamic behavior information of the passenger, the control unit may determine a belt wearing weight factor or belt wearing saturation over time, when the passenger wears a seat belt, and determine e a belt non-wearing weight factor or belt non-wearing saturation over time, when the passenger does not wear the seat belt.

In the calculating of the dynamic behavior information of the passenger, the control unit may calculate an actual position of the passenger by adding the seat position information and the displacements of the passenger's head and chest.

In the determining of the airbag deployment point, the control unit may determine that the airbag deployment point has reached, when the head and chest displacements corresponding to the actual position of the passenger are equal to or greater than preset head and chest displacement thresholds, respectively.

In the determining of the airbag deployment point, the control unit may receive a collision sensing value from the collision sensing unit, calculate a change in the collision sensing value, calculate the moving average and speed of the collision sensing value when the change in the collision sensing value is equal to or greater than a threshold change, and determine that the airbag deployment point has reached, when the moving average of the collision sensing value is equal to or greater than a threshold moving average and the speed of the collision sensing value is equal to or greater than a threshold speed.

In accordance with the embodiments of the present disclosure, the airbag deployment control apparatus and method for a vehicle may determine an airbag deployment point based on passenger behavior estimation in case of a vehicle collision or emergency braking, such that the head and chest of a passenger who wears a seat belt or not hit the airbag at the point of time that the airbag is completely deployed, which makes it possible to reduce an injury to the passenger and to improve the stability.

The airbag deployment control apparatus and method for a vehicle in accordance with the embodiments of the present disclosure may prevent a backslap corresponding to a side effect which may occur in case of emergency braking of the active DAS, the backslap indicating the phenomenon that the airbag is deployed around a passenger's head and hits the passenger's face, as the airbag deployment point is delayed.

The airbag deployment control apparatus and method for a vehicle in accordance with the embodiments of the present disclosure may apply the kinematics of the second ordinary differential equation (DMS model), and thus raise the accuracy of the passenger behavior estimation. Furthermore, the airbag deployment control apparatus and method for a vehicle may apply the DMS model to reduce the numbers of input values and parameters further than other models, which makes it possible to relatively simplify the configuration, and to reduce a memory capacity.

DETAILED DESCRIPTION OF THE INVENTION

Figure 1:
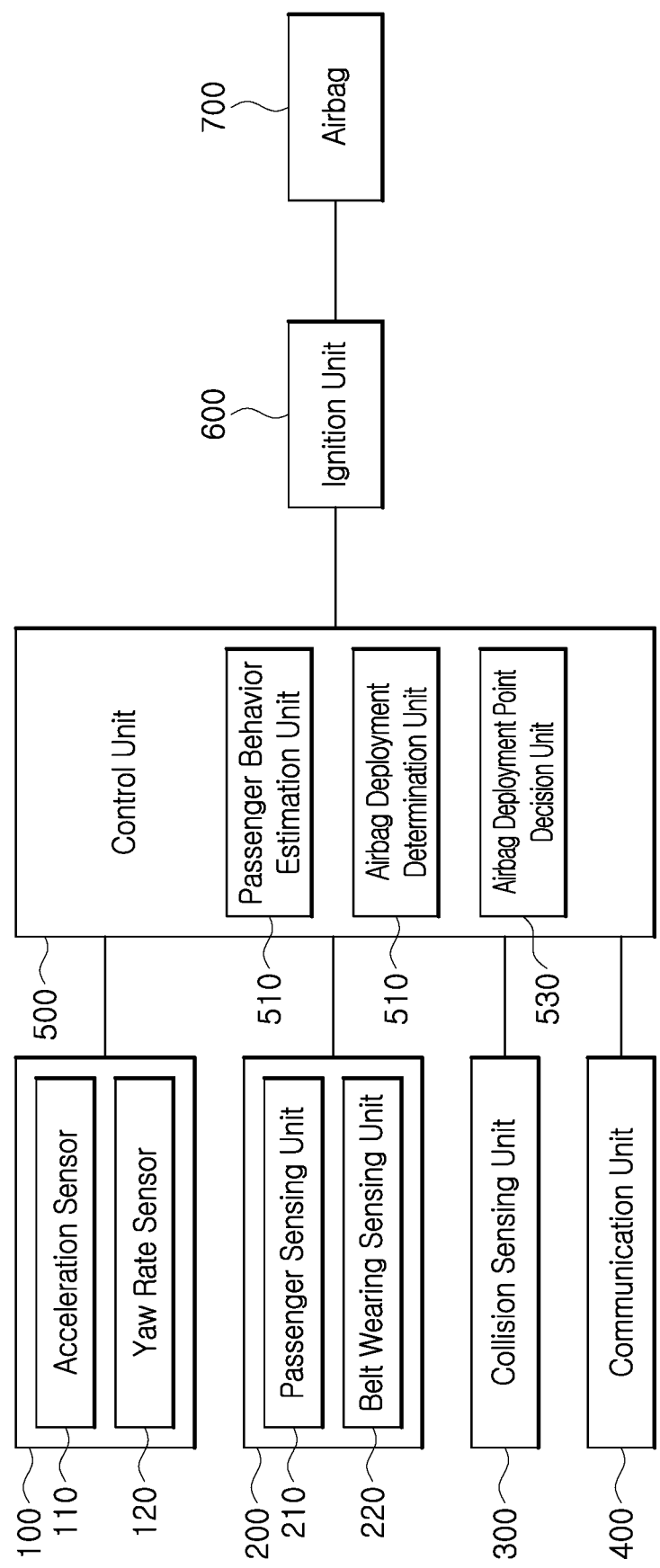
FIG. 1 is a diagram schematically illustrating an airbag deployment control apparatus for a vehicle in accordance with an embodiment of the present disclosure.

As is traditional in the corresponding field, some exemplary embodiments may be illustrated in the drawings in terms of functional blocks, units, and/or modules. Those of ordinary skill in the art will appreciate that these blocks, units, and/or modules are physically implemented by electronic (or optical) circuits such as logic circuits, discrete components, processors, hard-wired circuits, memory elements, wiring connections, and the like. When the blocks, units, and/or modules are implemented by processors or similar hardware, they may be programmed and controlled using software (e.g., code) to perform various functions discussed herein. Alternatively, each block, unit, and/or module may be implemented by dedicated hardware or as a combination of dedicated hardware to perform some functions and a processor (e.g., one or more programmed processors and associated circuitry) to perform other functions. Each block, unit, and/or module of some exemplary embodiments may be physically separated into two or more interacting and discrete blocks, units, and/or modules without departing from the scope of the inventive concept. Further, blocks, units, and/or module of some exemplary embodiments may be physically combined into more complex blocks, units, and/or modules without departing from the scope of the inventive concept.

Hereinafter, an airbag deployment control apparatus and method for a vehicle will be described below with reference to the accompanying drawings through various exemplary embodiments. It should be noted that the drawings are not to precise scale and may be exaggerated in thickness of lines or sizes of components for descriptive convenience and clarity only. Furthermore, the terms as used herein are defined by taking functions of the invention into account and can be changed according to the custom or intention of users or operators. Therefore, definition of the terms should be made according to the overall disclosures set forth herein.

The embodiments described in this specification may be implemented with a method or process, a device, a software program, a data stream or a signal, for example. Although a feature is discussed only in a single context (for example, discussed only in a method), the discussed feature can be implemented in another type (for example, apparatus or program). An apparatus may be implemented in suitable hardware, software or firmware. The method can be implemented in a device such as a processor which generally refers to a processing device including a computer, a microprocessor, an integrated circuit or a programmable logic device. The processor also includes a communication device, such as a computer, cellular phone, PDA (Personal Digital Assistant) and another device, which facilitates information communication between end users.

Figure 2A:
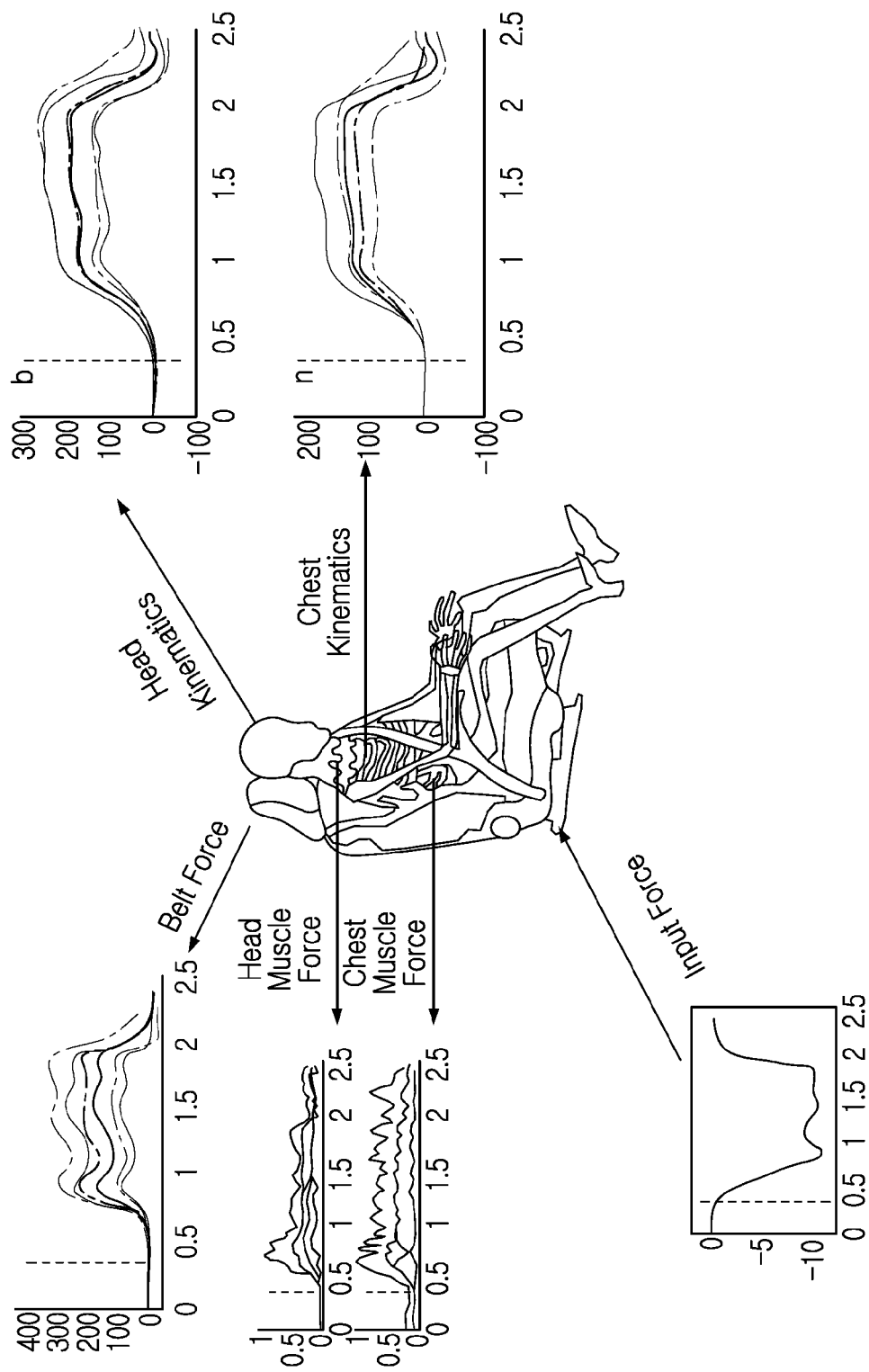
FIGS. 2A and 2B are diagrams describing forces applied to a passenger and a position change model based on the forces, in accordance with the embodiment of the present disclosure.
Figure 2B:
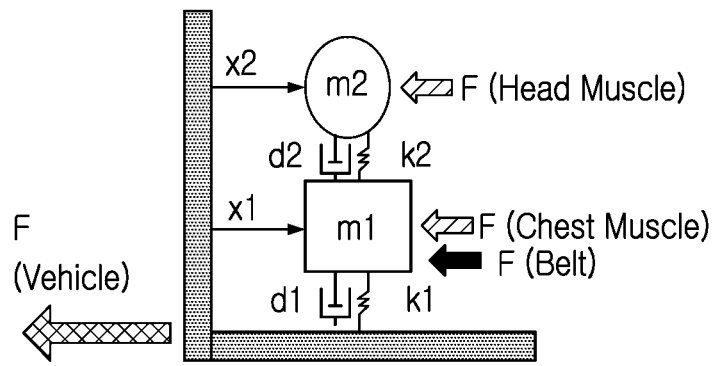

FIG. 1 is a diagram schematically illustrating an airbag deployment control apparatus for a vehicle in accordance with an embodiment of the present disclosure, and FIGS. 2A and 2B are diagram describing forces applied to a passenger and a position change model based on the forces, in accordance with the embodiment of the present disclosure.

Referring to FIG. 1, the airbag deployment control apparatus for a vehicle in accordance with the embodiment of the present disclosure may include a first sensing unit 100, a second sensing unit 200, a collision sensing unit 300, a communication unit 400, a control unit 500, an ignition unit 600 and an airbag 700.

The first sensing unit 100 may sense yaw rate information of the vehicle. The yaw rate information may include acceleration and yaw rate values. In the present embodiment, the first sensing unit 100 may include an acceleration sensor 110 and a yaw rate sensor 120. The acceleration sensor 110 may sense X-axis and Y-axis acceleration values of the vehicle in operation, and the yaw rate sensor 120 may sense the yaw rate value of the vehicle in operation. In the present embodiment, the first sensing unit 100 is limited to the acceleration sensor 110 and the yaw rate sensor 120. However, the present embodiment is not limited, but the first sensing unit 100 may include any component capable of sensing dynamic behavior information of the vehicle.

The second sensing unit 200 may sense information related to a passenger on board the vehicle. In the present embodiment, the second sensing unit 200 may include a passenger sensing unit 210 and a belt wearing sensing unit 220. The passenger sensing unit 210 may sense whether a passenger is in the vehicle, by using one or more of a WCS (Weight Classification System), HSS (Human Sensing System) and SBR (Seat Belt Remainder). The belt wearing sensing unit 220 may sense whether a passenger in the vehicle wears a seat belt. That is, the belt wearing sensing unit 220 may be installed in each seat, and configured to sense whether a passenger in each seat wears a seat belt. The belt wearing sensing unit 220 may sense whether a passenger in each seat wears a seat belt, and provide the sensing result to the control unit 500. Here, the passenger may include a driver and a passenger on board with the driver.

The collision sensing unit 300 may serve to sense whether the vehicle collides, and measure the X-axis and Y-axis acceleration values of the vehicle. Thus, the collision sensing unit 300 may include an acceleration sensor. Furthermore, the acceleration signals measured by the collision sensing unit 300 may be processed by a low-pass filter, and then provided to the control unit 500. The control unit 500 may receive the vehicle collision sensing result from the collision sensing unit 300, and use the received vehicle collision sensing result to determine an airbag deployment point. That is, the control unit 500 may determine the airbag deployment point by determining how hard the vehicle collides, based on the acceleration values measured by the collision sensing unit 300, without using information on how much the vehicle is broken.

The communication unit 400 may receive ADAS (Advanced Driver Assistance Systems) operation information and seat position information of the vehicle. The ADAS operation information may include LKAS (Lane Keeping Assist System) data, PSM (Porsche Stability Management) data and the like. The LKAS data may be 0 or 1, where 0 indicates the case in which the LKAS is not operated, and 1 indicates the case in which the LKAS is operated or the vehicle moves out of a lane. The communication unit 400 may be a CAN communication unit, for example.

The airbag 700 is a safety device which is deployed while being filled with a large amount of gas. When an impact is applied to the vehicle, the airbag 70 may restrain the body of the passenger and thus reduce an injury to the passenger.

The ignition unit 600 may serve to deploy the corresponding airbag 700 among the plurality of airbags 700 installed in the vehicle, at an airbag deployment point of the vehicle. According to a control signal of the control unit 500, the ignition unit 600 may be ignited to deploy the corresponding airbag 700 among the plurality of airbags 700. The plurality of airbags 700 may include one or more of a driver airbag, a passenger airbag, a knee airbag, a side airbag and a curtain airbag, but the present disclosure is not limited thereto. The driver airbag may be installed in front of a driver seat, the passenger airbag may be installed in front of a passenger seat, the knee airbag may be installed at a position corresponding to the knee of a passenger, the side airbag may be installed at a side surface of the vehicle, and the curtain airbag may be installed so as to be deployed across an area from the front of the driver seat to a rear seat. The installation positions of the respective airbags are not limited. Thus, the ignition unit 600 may include a DAB (Driver Airbag) ignition unit, a PAB (Passenger Airbag) ignition unit, a KAB (Knee Airbag) ignition unit, an SAB (Side Airbag) ignition unit and a CAB (Curtain Airbag) ignition unit.

The control unit 500 may calculate dynamic behavior information of a passenger by inputting the yaw rate information from the first sensing unit 100, the belt wearing information from the second sensing unit 200 and the ADAS operation information from the communication unit 400 to a passenger behavior estimation algorithm, and determine an airbag deployment point based on the dynamic behavior information of the passenger and the collision sensing result of the collision sensing unit 300.

The control unit 500 may include a passenger behavior estimation unit 510, an airbag deployment determination unit 520 and an airbag deployment point decision unit 530.

The passenger behavior estimation unit 510 may calculate the dynamic behavior information of the passenger by inputting the yaw rate information, the belt wearing information and the ADAS operation information to the passenger behavior estimation algorithm. The passenger behavior estimation algorithm may be a second ordinary differential equation of a Damper-Mass-Spring (DMS) model.

The passenger behavior estimation unit 510 may derive a second ordinary differential equation by applying a vehicle/passenger model dynamics FBD to the DMS model, and calculate the dynamic behavior information of the passenger by inputting the yaw rate information, the belt wearing information and the ADAS operation information to the second ordinary differential equation. The dynamic behavior information of the passenger may include X-axis and Y-axis displacements of the passenger's chest and X-axis and Y-axis displacements of the passenger's head.

The passenger behavior may be modeled as illustrated in FIGS. 2A and 2B. FIG. 2A shows a result obtained by mathematically modeling the passenger behavior, and FIG. 2B shows a result obtained by modeling the passenger behavior based on the DMS model. From the DMS model for passenger behavior, a second ordinary differential equation may be derived as expressed as Equation 1 below.

$$m_1\ddot{x}_1 = k_2(x_2-x_1) + d_2(\dot{x}_2-\dot{x}_1) - k_1 x_1 - d_1 \dot{x}_1 \, m_2\ddot{x}_2 = F - k_2(x_2-x_1) - d_2(\dot{x}_2-\dot{x}_1) \quad \text{[Equation 1]}$$

In Equation 1, m1 may represent the mass of a passenger's chest, m2 may represent the mass of the passenger's head, $x_1$ may represent the displacement of the passenger's chest on the X-axis from 0, $x_2$ may represent the displacement of the passenger's head on the X-axis from, $\dot{x}_1$ may represent the speed of the passenger's chest, $\dot{x}_2$ may represent the speed of the passenger's head, $\ddot{x}_1$ may represent the acceleration of the passenger's chest, $\ddot{x}_2$ may represent the acceleration of the passenger's head, k1 may represent the spring constant of the passenger's chest, k2 may represent the spring constant of the passenger's head, d1 may represent the damping coefficient of the passenger's chest, d2 may represent the damping coefficient of the passenger's head, and F may represent an external force acting on the body. The spring constants and the damping coefficients may be preset and changed according to the body size of a passenger.

The passenger behavior estimation unit 510 may apply the kinematics of the second ordinary differential equation (DMS model) to estimate the passenger behavior (motion) in case of emergency braking or avoidance braking, and the numbers of input values and parameters may be reduced further than in other analysis models, which makes it possible to relatively simplify the modeling.

The passenger behavior estimation unit 510 may calculate the displacements, speeds and accelerations of the passenger's head and chest by using Equation 1.

The passenger behavior estimation unit 510 may process the acceleration values from the acceleration sensor 110 through a low-pass filter, and then calculate the speeds and displacements. That is, the passenger behavior estimation unit 510 may receive the X-axis and Y-axis accelerations from the acceleration sensor 110, calculate the X-axis and Y-axis speeds through integration, and calculate the X-axis and Y-axis displacements through double integration.

Depending on whether the passenger wears the seat belt, the accelerations of the passenger's head and chest may be changed. Thus, the passenger behavior estimation unit 510 may determine a weight factor or saturation based on the belt wearing information from the second sensing unit 200, and apply the determined weight factor or saturation to the accelerations of the passenger's head and chest.

Specifically, when the passenger wears the seat belt, the passenger behavior estimation unit 510 may determine a belt wearing weight factor or belt wearing saturation over time. Furthermore, when the passenger does not wear the seat belt, the passenger behavior estimation unit 510 may determine a belt non-wearing weight factor or belt non-wearing saturation with the elapse of time. The belt wearing weight factor, the belt wearing saturation, the belt non-wearing weight factor and the belt non-wearing saturation may be preset, and the values thereof may be changed according to the body size and age of the passenger.

For example, when the passenger is seated while wearing the seat belt, the accelerations of the passenger's head and chest may be rapidly decreased by restraint through belt tension. Furthermore, when the passenger is seated while not wearing the seat belt, the accelerations of the passenger's head and chest may be increased by action and reaction caused by a sudden stop. Therefore, when calculating the accelerations of the passenger's head and chest, the passenger behavior estimation unit 510 may apply a weight factor and saturation according to the belt wearing information. That is, when the passenger is seated while not wearing the seat belt, the X-axis motion may be reduced by belt tension. Thus, the passenger behavior estimation unit 510 may lower the acceleration by applying the saturation. On the other hand, when the passenger is seated while wearing the seat belt, the passenger behavior estimation unit 510 may raise the acceleration by applying the weight factor.

Furthermore, the passenger behavior estimation unit 510 may apply autonomous LKAS data or LKAS message and thus analyze and apply a locking condition as a condition close to a real situation. The LKAS applies a message to assist a driver to keep a lane. When a collision is sensed, the driver rapidly moves the steering wheel to avoid the collision. Since this behavior was intended by the driver, the muscle tension of the driver's neck may increase. As the muscle tension increases, the motion of the driver's head or chest decreases.

Thus, the passenger behavior estimation unit 510 may determine a locking weight factor based on the yaw rate value and the LKAS data.

Specifically, when the yaw rate value is equal to or greater than a preset threshold and the LKAS data of the ADAS operation information is '1' (the ADAS operation information contains data indicating that the LKAS is operating), the passenger behavior estimation unit 510 may determine a locking weight factor based on Keeping Lane (KL). Furthermore, when the yaw rate value is equal to or greater than the threshold and the LKAS data of the ADAS operation information is '0' (the ADAS operation information contains data indicating that the LKAS is not operating), the passenger behavior estimation unit 510 may determine a locking weight factor based on Turn Around (TA). At this time, the locking weight factor based on KL and the locking weight factor based on TA may be preset values.

For example, when the vehicle moves out of the traveling lane due to drowsy driving and another vehicle is traveling on an adjacent lane, the vehicle may recognize another vehicle and try to return to the traveling lane (KL). At this time, LKAS data may be generated while a transverse force is generated in the vehicle, and the passenger may be moved in a diagonal direction. Thus, the passenger behavior estimation unit 510 may determine the locking weight factor using the yaw rate value and the LKAS data. The LKAS data may be 0 or 1, where 0 indicates the case in which the LKAS is not operated, and 1 indicates the case in which the LKAS is operated or the vehicle moves out of a lane.

Furthermore, when the vehicle makes a left or right turn at an intersection, the vehicle may suddenly stop in case that another vehicle breaks into the lane (TA). At this time, when a left or right turn signal is turned on, the LKAS data may be 0. Thus, the passenger behavior estimation unit 510 may determine the locking weight factor using the yaw rate value during TA.

As described above, when the yaw rate value is equal to or greater than the threshold and the LKAS data is '1', the passenger behavior estimation unit 510 may determine that the current situation is KL, and calculate the locking weight factor based on KL. That is, when the yaw rate value is equal to or greater than the threshold and the LKAS data is '1', the passenger behavior estimation unit 510 may determine that a transverse motion occurred, and calculate a locking weight factor for transverse acceleration. At this time, the locking weight factor may be a value for further raising acceleration or a value for further lowering acceleration. As such, when the yaw rate value is equal to or greater than the threshold and the LKAS data is '1', the passenger behavior estimation unit 510 may calculate the locking weight factor capable of raising or lowering the acceleration.

Furthermore, when the yaw rate value is equal to or greater than the threshold and the LKAS data is '0', the passenger behavior estimation unit 510 may determine that the current situation is TA, and calculate the locking weight factor based on TA.

When the locking weight factor based on the yaw rate value and the LKAS message and the saturation or weight factor based on the belt wearing information are determined as described above, the passenger behavior estimation unit 510 may calculate the accelerations of the passenger's head and chest by inputting at least one of the acceleration of the vehicle, the locking weight factor, the saturation and the weight factor to the second ordinary differential equation.

That is, the passenger behavior estimation unit 510 may calculate the X-axis and Y-axis displacements according to the second ordinary differential equation implemented as a feedback system through the belt wearing condition and the locking condition, and calculate the displacements, speeds and accelerations of the passenger's head and chest by using the calculated X-axis and Y-axis displacements. At this time, the calculated displacements of the passenger's head and chest are not actual displacements of the passenger's head and chest. Thus, the passenger behavior estimation unit 510 may receive seat position information through the communication unit 400, and calculate the actual position of the passenger by adding the seat position information and the displacements of the passenger's head and chest.

The airbag deployment determination unit 520 may receive a collision sensing value from the collision sensing unit 300, and calculate a change in the collision sensing value. When the change in the collision sensing value is equal to or greater than a threshold change, the airbag deployment determination unit 520 may calculate moving average and speed of the collision sensing value.

At this time, the airbag deployment determination unit 520 may process the X-axis and Y-axis acceleration signals measured by the collision sensing unit 300 through a low-pass filter, and then calculate the X-axis and Y-axis speeds and displacements. That is, the airbag deployment determination unit 520 may calculate the speeds by integrating the X-axis and Y-axis acceleration values measured by the collision sensing unit 300, and calculate the displacements through double integration. The airbag deployment determination unit 520 may determine whether to deploy the airbag after the collision, according to the calculated displacements.

The airbag deployment point decision unit 530 may determine an airbag deployment point based on head and chest displacements, which correspond to the actual position of the passenger calculated by the passenger behavior estimation unit 510, and the moving average and speed of the collision sensing value calculated by the airbag deployment determination unit 520.

Specifically, when the head and chest displacements, which correspond to the actual position of the passenger calculated by the passenger behavior estimation unit 510, are equal to or greater than preset head and chest displacement thresholds, respectively, the moving average of the collision sensing value calculated by the airbag deployment determination unit 520 is equal to or greater that a threshold moving average, and the speed of the collision sensing value is equal to or greater than a threshold speed, the airbag deployment point decision unit 530 may determine that the airbag deployment point has reached.

For example, the airbag deployment point decision unit 530 may determine whether the displacement of the passenger's head is greater than the head displacement threshold (e.g. 0.3 m at a high speed of 60 km/s or more), and the displacement of the passenger's chest is greater than the chest displacement threshold (e.g. 0.2 m at a high speed of 60 km/s or more).

When a sudden stop is caused by the DAS, the passenger's head and chest may be rapidly moved. Thus, when the displacement of the passenger's head or chest is equal to or greater than the head or chest displacement threshold, the airbag deployment point decision unit 530 may determine the airbag deployment point as an earlier point than the existing airbag deployment point.

In the present embodiment, when a collision or emergency braking occurs, the airbag deployment control apparatus may determine the airbag deployment point using the dynamic behavior information of the passenger, such that the airbag deployment point becomes earlier than the existing airbag deployment point. Thus, the situation in which the passenger's head and/or chest crash into the steering wheel before the airbag 700 is completely deployed may not occur, which makes it possible to prevent an injury to the passenger.

In the present embodiment, the airbag deployment control apparatus may include a safing sensor (not illustrated) to prevent a sensing error of the collision sensing unit 300. That is, the safing sensor may indicate an assist sensor which serves to assist the control unit 500 to determine whether to deploy the airbag based on the collision sensing result from the collision sensing unit 300. The safing sensor may sense a collision through which the control unit 500 can determine whether to deploy the airbag, according to separate safing logic, and provide the sensing result to the control unit 500.

Figure 3:
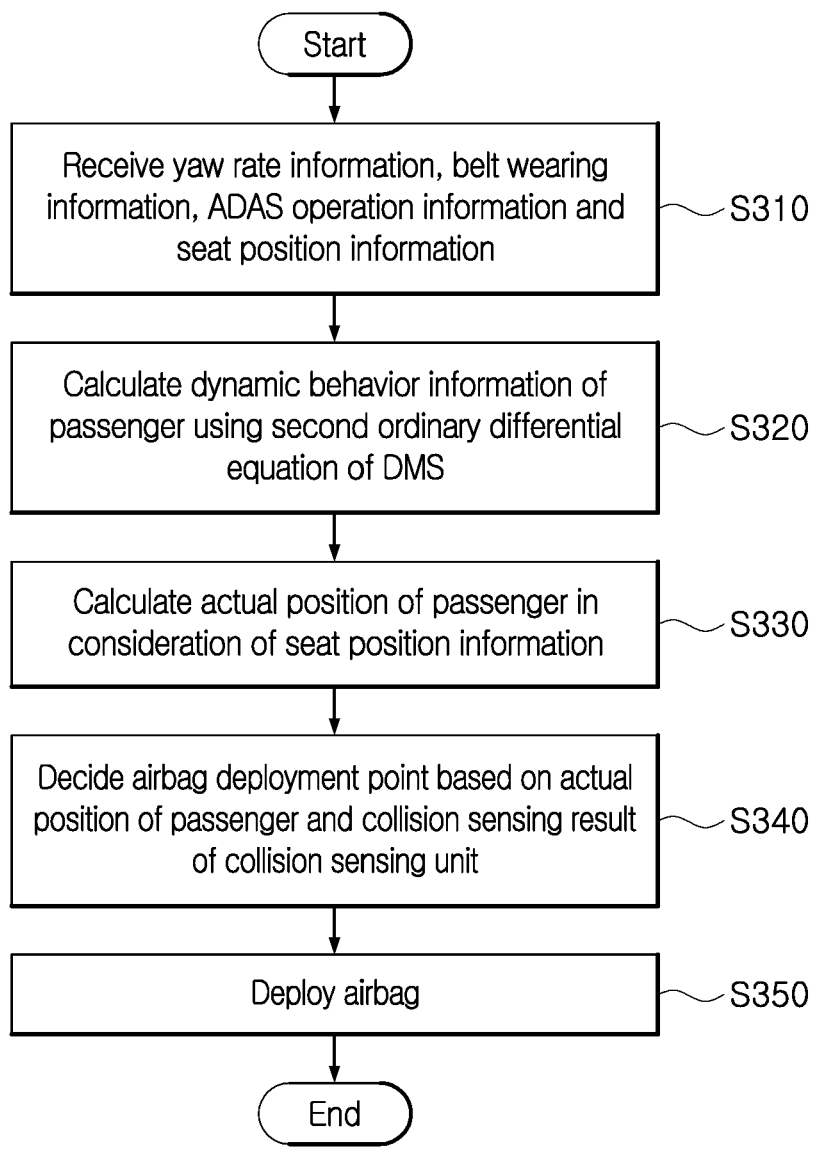
FIG. 3 is a flowchart describing an airbag deployment control method for a vehicle in accordance with an embodiment of the present disclosure.

FIG. 3 is a flowchart for describing an airbag deployment control method for a vehicle in accordance with an embodiment of the present disclosure.

Referring to FIG. 3, the control unit 500 receives, from the first sensing unit 100, yaw rate information including the acceleration and yaw rate values of a vehicle, receives belt wearing information from the belt wearing sensing unit 220, and receives ADAS operation information and seat position information through the communication unit 400, in step S310.

When step S310 is performed, the control unit 500 calculates dynamic behavior information of a passenger by inputting the yaw rate information, the belt wearing information and the ADAS operation information to the second ordinary differential equation of the DMS model, in step S320. At this time, the control unit 500 may determine a weight factor or saturation based on the belt wearing information, and apply the determined weight factor or saturation to the accelerations of the passenger's head and chest. Furthermore, the control unit 500 may determine a locking weight factor based on the yaw rate value and LKAS data, and apply the determined locking weight factor to the accelerations of the passenger's head and chest. The dynamic behavior information of the passenger may include the X-axis and Y-axis displacements, speeds and accelerations of the passenger's head and chest.

When step S320 is performed, the control unit 500 calculates an actual position of the passenger by adding the seat position information and the displacements of the passenger's head and chest, in step S330.

When step S330 is performed, the control unit 500 determines an airbag deployment point based on the actual position of the passenger and the collision sensing result of the collision sensing unit 300, in step S340. That is, the control unit 500 may determine the airbag deployment point based on the displacements of the passenger's head and chest, corresponding to the actual position of the passenger, and moving average and speed of the collision sensing value from the collision sensing unit 300. Specifically, when the head and chest displacements corresponding to the actual position are equal to or greater than preset head and chest displacement thresholds, respectively, the moving average of the collision sensing value is equal to or greater than a threshold moving average, and the speed of the collision sensing value is equal or greater than a threshold speed, the control unit 500 may determine that the airbag deployment point has reached.

When step S340 is performed, the control unit 500 controls the ignition unit 600 to deploy the corresponding airbag 700 at the airbag deployment point, in step S350. At this time, the ignition unit 600 may serve to deploy the corresponding airbag 700, among the plurality of airbags 700 installed in the vehicle, at the airbag deployment point of the vehicle. According to a control signal of the control unit 500, the ignition unit 600 may be ignited to deploy the corresponding airbag among the plurality of airbags.

Figure 4:
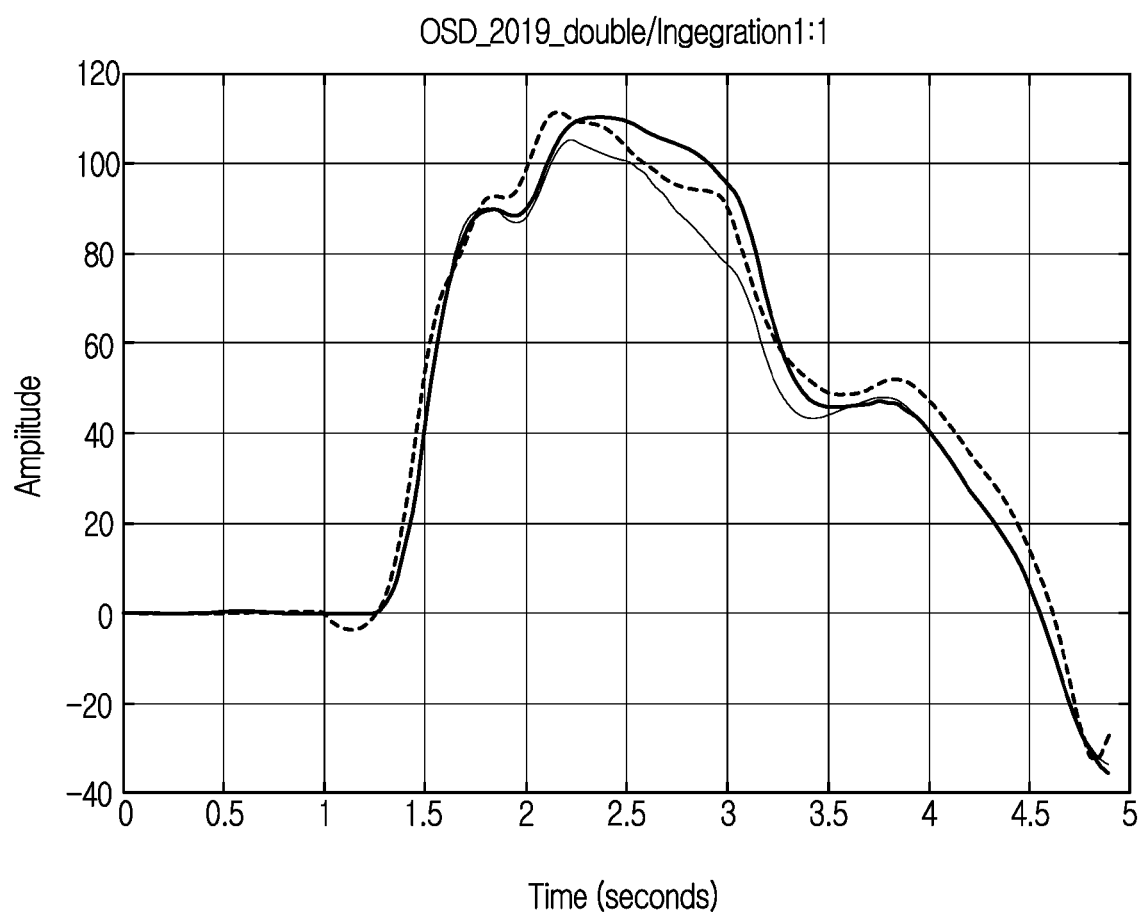
FIG. 4 is a diagram describing simulation data based on a passenger behavior estimation algorithm model in accordance with the embodiment of the present disclosure.

FIG. 4 is a diagram for describing simulation data based on a passenger behavior estimation algorithm model in accordance with the embodiment of the present disclosure.

FIG. 4 shows that a result value (output) of the passenger behavior estimation algorithm model simulates an actual situation of the vehicle more accurately than in other models. Therefore, the second ordinary differential equation of the DMS model may have high reliability in estimating the displacements and speeds of the passenger's head and chest.

As described above, the airbag deployment control apparatus and method for a vehicle in accordance with the embodiments of the present disclosure may determine an airbag deployment point based on passenger behavior estimation in case of a vehicle collision or emergency braking, such that the head and chest of a passenger who wears a seat belt or not hit the airbag at the point of time that the airbag is completely deployed, which makes it possible to reduce an injury to the passenger and to improve the stability.

The airbag deployment control apparatus and method for a vehicle in accordance with the embodiments of the present disclosure may prevent a backslap corresponding to a side effect which may occur in case of emergency braking of the active DAS, the backslap indicating the phenomenon that the airbag is deployed around a passenger's head and hits the passenger's face, as the airbag deployment point is delayed.

The airbag deployment control apparatus and method for a vehicle in accordance with the embodiments of the present disclosure may apply the kinematics of the second ordinary differential equation (DMS model), and thus raise the accuracy of the passenger behavior estimation. Furthermore, the airbag deployment control apparatus and method for a vehicle may apply the DMS model to reduce the numbers of input values and parameters further than other models, which makes it possible to relatively simplify the configuration, and to reduce a memory capacity.

Although exemplary embodiments of the disclosure have been disclosed for illustrative purposes, those skilled in the art will appreciate that various modifications, additions and substitutions are possible, without departing from the scope and spirit of the disclosure as defined in the accompanying claims. Thus, the true technical scope of the disclosure should be defined by the following claims.

What is claimed is:

1. An airbag deployment control apparatus for a vehicle, comprising:
   a first sensing unit configured to sense yaw rate information including a yaw rate and acceleration value of a vehicle;
   a second sensing unit configured to sense whether a passenger in the vehicle is wearing a seat belt, and generate belt wearing information;
   a collision sensing unit configured to sense whether a collision of the vehicle has occurred;
   a communication unit configured to receive seat position information and Advanced Driver Assistance Systems (ADAS) operation information of the vehicle; and
   a control unit configured to calculate dynamic behavior information of the passenger by inputting, to a passenger behavior estimation algorithm, the yaw rate information, the belt wearing information and the ADAS operation information, and determine an airbag deployment point based on the dynamic behavior information of the passenger and the sensed collision of the vehicle.

2. The airbag deployment control apparatus of claim 1, wherein the passenger behavior estimation algorithm comprises a second order differential equation based on Damper-Mass-Spring (DMS) model.

3. The airbag deployment control apparatus of claim 2, wherein the control unit is further configured to:
   determine a locking weight factor based on the yaw rate and the ADAS operation information;
   determine a weight factor and saturation based on the belt wearing information; and
   calculate the dynamic behavior information by applying, to the second order differential equation, at least one of the acceleration value, the locking weight factor, and the weight factor and saturation, the dynamic behavior information including at least one of displacements, speeds and accelerations of the passenger's head and chest.

4. The airbag deployment control apparatus of claim 3, wherein the control unit is further configured to:
   determine a locking weight factor based on Keeping Lane (KL) when the yaw rate is equal to or greater than a preset threshold and the ADAS operation information contains data indicating that a Lane Keeping Assist System (LKAS) is operating and
   determine the locking weight factor based on Turn Around (TA) when the yaw rate is equal to or greater than the preset threshold, and the ADAS operation information contains data indicating that the LKAS is not operating.

5. The airbag deployment control apparatus of claim 3, wherein the control unit is further configured to:

determine a belt wearing weight factor or belt wearing saturation over time when the passenger is sensed to be wearing the seat belt, and determine a belt non-wearing weight factor or belt non-wearing saturation over time when the passenger is sensed not to be wearing the seat belt.

6. The airbag deployment control apparatus of claim 3, wherein the control unit is further configured to calculate an actual position of the passenger by adding together the seat position information and the displacements of the passenger's head and chest.

7. The airbag deployment control apparatus of claim 6, wherein the control unit is further configured to determine that the airbag deployment point has been reached when the displacements of the passenger's head and chest corresponding to an actual position of the passenger are equal to or greater than preset head and chest displacement thresholds.

8. The airbag deployment control apparatus of claim 7, wherein the control unit is further configured to:
  receive a collision sensing value from the collision sensing unit;
  calculate a change in the collision sensing value;
  calculate a moving average and speed of the collision sensing value when the change to the collision sensing value is equal to or greater than a threshold change; and
  determine that the airbag deployment point has been reached when the moving average of the collision sensing value is equal to or greater than a threshold moving average, and the speed of the collision sensing value is equal to or greater than a threshold speed.

9. A method for controlling airbag deployment of a vehicle, comprising:
  receiving yaw rate information, belt wearing information, Advanced Driver Assistance Systems (ADAS) operation information and seat position information, the yaw rate information including acceleration and yaw rate values of a vehicle;
  sensing whether a collision of the vehicle has occurred;
  calculating dynamic behavior information of a passenger by inputting, to a passenger behavior estimation algorithm, the yaw rate information, the belt wearing information and the ADAS operation information; and
  determining an airbag deployment point based on the dynamic behavior information of the passenger and a result of sensing whether a collision of the vehicle has occurred.

10. The airbag deployment control method of claim 9, wherein the passenger behavior estimation algorithm implements a second order differential equation based on a Damper-Mass-Spring (DMS) model.

11. The airbag deployment control method of claim 10, wherein calculating the dynamic behavior information of the passenger comprises:
  determining a locking weight factor based on the yaw rate value and the ADAS operation information;
  determining a weight factor or saturation based on the belt wearing information, and
  applying, to the second order differential equation, at least one of the acceleration, the locking weight factor, the saturation and the weight factor to calculate the dynamic behavior information, the dynamic behavior information including at least one of displacements, speeds and accelerations of the passenger's head and chest.

12. The airbag deployment control method of claim 11, wherein calculating the dynamic behavior information of the passenger further comprises:
  determining a locking weight factor based on Keeping Lane (KL) when the yaw rate value is equal to or greater than a preset threshold and the ADAS operation information contains data indicating that a Lane Keeping Assist System (LKAS) is operating; and
  determining a locking weight factor based on Turn Around (TA) when the yaw rate value is equal to or greater than the threshold value, and the ADAS operation information contains data indicating that the LKAS is not operating.

13. The airbag deployment control method of claim 11, wherein calculating the dynamic behavior information of the passenger further comprises:
  determining a belt wearing weight factor or belt wearing saturation over time when the passenger is wearing a seat belt; and
  determining a belt non-wearing weight factor or belt non-wearing saturation over time when the passenger is not wearing the seat belt.

14. The airbag deployment control method of claim 11, wherein calculating the dynamic behavior information of the passenger further comprising calculating an actual position of the passenger by adding the seat position information and the displacements of the passenger's head and chest.

15. The airbag deployment control method of claim 14, wherein determining the airbag deployment point comprises determining that the airbag deployment point has reached when the displacements of the passenger's head and chest corresponding to the actual position of the passenger are equal to or greater than preset thresholds of head and chest displacements, respectively.

16. The airbag deployment control method of claim 15, wherein determining the airbag deployment point further comprises:
  receiving a collision sensing value;
  calculating a change to the collision sensing value;
  calculating a moving average and speed of the collision sensing value when the change to the collision sensing value is equal to or greater than a threshold change; and
  determining that the airbag deployment point has been reached when the moving average of the collision sensing value is equal to or greater than a threshold moving average, and the speed of the collision sensing value is equal to or greater than a threshold speed.

* * * * *